United States Patent [19]

Adams et al.

[11] Patent Number: 4,869,890
[45] Date of Patent: Sep. 26, 1989

[54] CONTROL OF NITRIC ACID PLANT STACK OPACITY DURING START-UP AND SHUTDOWN

[75] Inventors: Joseph B. Adams, Coplay, Pa.; James A. Gaspar; Paul J. Stash, both of Houston, Tex.

[73] Assignee: Air Products and Chemicals, Inc., Allentown, Pa.

[21] Appl. No.: 177,713

[22] Filed: Apr. 5, 1988

[51] Int. Cl.⁴ .......................................... C01B 21/40
[52] U.S. Cl. .................................................. 423/392
[58] Field of Search ........................................ 423/392

[56] References Cited

U.S. PATENT DOCUMENTS

| | | | |
|---|---|---|---|
| 2,955,917 | 10/1960 | Roberts et al. | 23/162 |
| 3,425,803 | 2/1969 | Romeo | 423/392 |
| 3,450,498 | 6/1969 | Sales | 23/162 |
| 3,927,182 | 12/1975 | Powell | 423/392 |
| 3,977,832 | 8/1976 | Schofield | 432/392 |
| 4,087,250 | 5/1978 | Laue et al. | 23/262 |
| 4,183,906 | 1/1980 | Watson et al. | 423/392 |
| 4,305,919 | 12/1981 | Roller II | 423/392 |
| 4,330,520 | 5/1982 | Roller I | 423/392 |
| 4,562,052 | 12/1985 | Grab et al. | 423/235 |

FOREIGN PATENT DOCUMENTS

| | | | |
|---|---|---|---|
| 4614811 | 4/1971 | Japan . | |
| 402505 | 10/1973 | U.S.S.R. . | |
| 1146292 | 3/1969 | United Kingdom | 423/392 |

OTHER PUBLICATIONS

Andersen et al., "Catalytic Treatment of Nitric Acid Plant Tail Gas", *Industrial and Engineering Chemistry*, vol. 53, No. 3 (Mar. 1961), pp. 199–204.

*Primary Examiner*—John Doll
*Assistant Examiner*—Wayne A. Langel
*Attorney, Agent, or Firm*—Willard Jones, II; James C. Simmons; William F. Marsh

[57] ABSTRACT

The present invention is a process for the control of nitric acid plant stack opacity in the range from 0 to 10 percent during plant startup and shutdown. The process is a series of sequential steps which encompass maximizing pressure, water and air flow to the absorber and adding ammonia upstream of the catalytic combustor. The process is typically accomplished through an automatic control system.

1 Claim, 1 Drawing Sheet

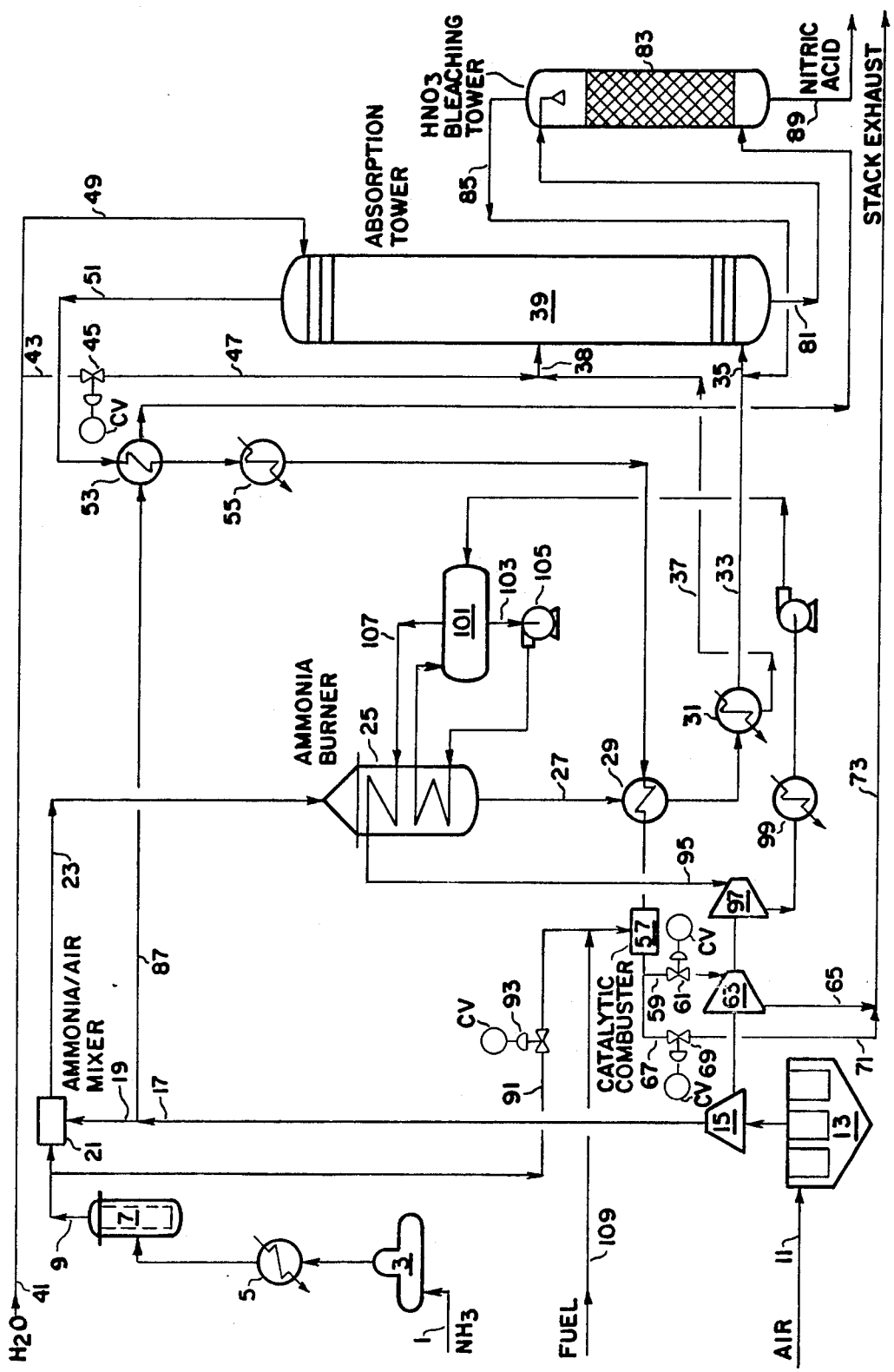

CONTROL OF NITRIC ACID PLANT STACK OPACITY DURING START-UP AND SHUTDOWN

TECHNICAL FIELD

The present invention relates to a process for the production of nitric acid, more specifically, to a process for controlling the nitric plant stack emission opacity during startup and shutdown.

BACKGROUND OF THE INVENTION

When nitric acid plants with catalytic combustors shutdown, they vent untreated $NO_2$ containing process gas. This vented gas creates a red, opaque plume because of its nitrogen dioxide content, e.g. vented gas containing a 200 ppm $NO_2$ concentration from a two (2) foot diameter stack creates a plume of 10% opacity. Although currently allowed by some state regulating agencies, increasingly stringent emission plume requirements are being imposed on the industry; therefore, there is a greater need to minimize or eliminate these emission plumes.

One solution to the nitric acid plant opacity problem has been suggested in U.S. Pat. No. 4,330,520. In this patent, Roller teaches a process and apparatus to prevent $NO_x$ emissions after an emergency shutdown in a process for manufacturing nitric acid. In the process, the intake nitrous gas to the compressor is interrupted, the residual intake nitrous gases are conveyed to the delivery side, the delivery side gas volume is shut off, the gas on the delivery side is expanded to the intake side and then exhausted into a vacuum system. Subsequently, the acid charged with $NO_x$ in the absorption stages is drawn off, degassed acid is circulated through the absorption stages until equilibrium is established, the pressure of the shut off section is released and cooled acid is admitted to the absorption stages.

SUMMARY OF THE INVENTION

The present invention is an improvement to control stack gas opacity during a shutdown or startup of a process for the production of nitric acid. The present invention is of particular improvement to a nitric acid process wherein air and ammonia are mixed and combusted in an ammonia burner to produce an effluent containing nitrogen oxides. This effluent is then cooled, condensed and separated into a liquid weak acid stream and gas stream. The liquid weak acid and gas streams are fed to an absorber tower wherein they are countercurrently contacted with water to produce a nitric acid stream and an overhead with a reduced nitrogen oxides content. Finally, the overhead is combusted with a fuel in the presence of a catalyst in a catalytic combustor to produce a combustor exhaust, which in turn is work expanded in an expander to recover energy and vented to the atmosphere as stack exhaust.

The improvement for controlling the stack opacity during shutdown of the process comprises: Ammonia is discontinued to the ammonia burner and fuel to the catalytic combustor. Water flow to the absorber tower is continued and an additional water flow is introduced to an intermediate location of the absorber tower at rate comparable to the flow, during steady-state operation of the process, of the liquid weak acid. Air flow is continued to maximize absorber pressure. When the outlet temperature of the catalytic combustor has decreased to about 1000° F., ammonia feed is introduced to the catalytic combustor at an effective rate so as to control stack opacity at a level less than 10% without an ammonia breakthrough in the stack exhaust. Finally, when the exit temperature of the expander declines to a temperature at which ammonium nitrates would form, i.e., about 400° F., work expansion of the combustion exhaust from the catalytic combustor is discontinued and such combustor exhaust is directly vented as stack exhaust; and when the outlet temperature of catalytic combustor declines to a temperature at which ammonium nitrates would form, i.e., about 400° F., ammonia addition to the catalytic combustor is discontinued.

The improvement for controlling the stack opacity during startup of the process comprises: Simultaneously with the ammonia addition to the ammonia burner, ammonia is introduced to the catalytic combustor at an effective rate so as to control stack opacity at a level less than 10% without an ammonia breakthrough in the stack exhaust. This introduction occurs only if the exit temperature of the expander is above the temperature at which ammonium nitrates are formed, i.e., about 400° F., and the outlet temperature of the catalytic combustor is below about 1000° F. Also, ammonia addition to the catalytic combustor is halted when fuel to the catalytic combustor is introduced.

BRIEF DESCRIPTION OF THE DRAWING

The single FIGURE of the drawing is a schematic diagram of a typical nitric acid production process with the necessary additional streams of the present invention.

DETAILED DESCRIPTION OF THE INVENTION

As stated earlier, the present invention is an improvement for the control of stack opacity during startup and shutdown to a process for the production of nitric acid. The control of stack opacity is important because it (stack opacity) is directly related to total $NO_x$ emmissions.

The present invention is best understood in light of a typical process for the production of nitric acid. With reference to the single figure of the drawing, liquid ammonia is fed to the process via line 1, wherein it is evaporated in evaporator 3, heated in exchanger 5 and filtered in ammonia filter 7, producing an ammonia vapor stream in line 9. Air is fed to the process in line 11, wherein it is filtered in filter 13 and compressed with compressor 15, producing a compressed air stream in line 17. Energy for compressor 15 is supplied by expander 63 and steam turbine 97. A majority of the compressed air stream in line 17 is fed via line 19 to ammonia/air mixer 21, wherein it is combined with ammonia vapor from line 9. This ammonia/air stream is fed fia line 23 to ammonia burner 25 for the production of nitrogen oxides.

The effluent from ammonia burner 25, in line 27, is cooled in heat exchanger 29 and further cooled, condensed and separated in condenser/separator 31. The overhead gas portion from condenser/separator 31, in line 33, is combined with bleach air exiting bleacher, in line 85, to form a combined nitrogen oxides containing gas stream in line 35. This combined gas stream is fed via line 35 to the bottom of absorber tower 39. The liquid portion from condenser/separator 31 is removed via line 37 and fed to an intermediate location of absorber tower 39 as weak acid feed.

The water introduced into the process via line 41 is fed to the top of absorber tower 39 via line 49. In absorber tower 39, upward flowing nitrogen oxides containing gas is contacted and absorbed into downward flowing water to form a nitric acid stream and a depleted overhead stream. This overhead stream is removed from absorber tower 39 via line 51 and heated in heat exchangers 53, 55 and 29 prior to being fed to catalytic combustor 57.

In addition to the heated absorber overhead stream, fuel is fed to catalytic combustor 57, via line 109. In catalytic combustor 57, the fuel is burned with the absorber overhead to produce an exhaust stream. Catalytic $NO_x$ abatement is also achievable in a reducing (oxygen depleted) atmosphere. This exhaust stream is removed via line 59, through control valve 61, and expanded in gas expansion turbine 63 in order to recover energy for air compression. The expanded exhaust gases from turbine 63, in line 65, is exhausted to the atmosphere via line 73.

The nitric acid stream from absorber tower 39 is removed via line 81 and fed to nitric acid bleacher tower 83. In bleacher 83, the nitric acid fed via line 81 is countercurrently contacted with compressed air supplied via line 87 as a final cleanup step. The liquid removed from the bottom of bleacher 83 via line 89 is recovered as nitric acid product. The overhead vapor from bleacher 83 is recycled to absorber tower 39 via line 85.

Finally, the process embodies a steam generation cycle for the provision of the additional energy needed to drive air compressor 15. In the cycle, superheated steam in line 95 is work expanded in condensing steam turbine 97, fully condensed in heat exchanger 99 and pumped to steam drum 101 for separation. Liquid from steam drum 101, in line 103, is pumped with pump 105 through an exchanger downstream of ammonia burner 25 to produce steam, this steam is returned to steam drum 101. The overhead from steam drum 101 is removed via line 107 and superheated in exchanger downstream ammonia burner 25. The superheated steam is removed from the exchanger downstream of ammonia burner 25 via line 95. The energy produced in steam condensing turbine 97 is used, in addition to that from turbine 63, to drive air compressor 15.

It is into a nitric acid production process such as this, that the present invention is incorporated. Although the nitric acid production process shown above is specific to one embodiment possible for the production of nitric acid, the present invention can be incorporated into any nitric acid production process utilizing similar technology.

The present invention controls stack opacity or color (stack emission source to atmosphere) during startup and shutdown of nitric acid producing plant. This control is typically accomplished automatically via a control system for startup/shutdown comprising: auxiliary power speed control, automatic compressor anti-surge protection, temperature input for ammonia addition, temperature input to divert tail gas from expander (valve inlet expander closed and vent valve to stack opened), temperature input to discontinue ammonia addition, absorber pressure control with gas expansion turbine inlet valve, automatic absorber water supply at shutdown initiation.

Procedural steps of the control during shutdown are as follows: Shutdown is defined as occurring when ammonia to ammonia burner and fuel to catalytic combustor are stopped yet air flow is continued through the system at a reduced rate as compared to normal operation.

Upon plant shutdown, water is continued to be fed to the top of absorber tower 39 and additional water, in line 43, is fed to absorber tower 39 via line 38 at the weak acid feed point; the addition of this extra water is accomplished by the opening of valve 45 and its flow through line 47. The opening and closing of valve 45 is controlled by the presence of flow in lines 9 and 109. The flow rates of these two streams are such that the total water flowing to absorber tower 39 is similar to the flow rates of water, line 49, and condensing/separator liquid, line 37 (during normal operation). Air flow and the absorber pressure are maximized via auxiliary power means, e.g., steam turbine, gas expansion turbine rundown, and back-pressure valve. Operating conditions, i.e., pressure and air flow, are process specific, however, the air flow must be kept above the minimum required to prevent sieve tray weeping. This step is continued throughout the procedure.

When the temperature at the outlet of catalytic combustor 57 cools to 1000° F., an effective amount of ammonia vapor is introduced into the combustor's supported platinum catalyst bed so as to reduce the stack opacity yet not cause the emission of ammonia. The ammonia is fed to the combustor via line 91 through control valve 93. The opening and closing of control valve 93 is controlled by the temperature of the outlet to catalytic combustor 57. From shutdown test and $NO_x$ analyses, the maximum $NO_2$ molar flow can be estimated. Typically, the ammonia rate is set at 1.33 to 1.6× the maximum $NO_2$ molar flow. Although the ammonia vapor is preferably a product of an ammonia vaporizer, nevertheless, ammonia can be obtained from any other source. Ammonia, if added at temperatures above 1000° F., will increase the amount of $NO_x$ emissions. Satisfactory combustor performance is obtained at space velocities from 2000–8000 GHSV.

When the exit temperature of expander 63 declines to 400° F., discontinue exhaust venting through expander 63 and vent catalytic combustor exhaust to stack via line 71. This bypass of expander 63 is accomplished by closing control valve 61 and opening control valve 69. Control valves 61 and 69 are controlled by the temperature of the exhaust, line 65, of expander 63. This step will prevent the formation of ammonium nitrates in expander.

When the temperature exit of catalytic combustor 57 declines to 400° F., ammonia addition via line 91 is discontinued by closing control valve 93 in order to prevent the formation of ammonium nitrate in catalytic combustor.

Procedural steps of the control during start-up are as follows: Start-up is defined as occurring when air is established through the system and ammonia is introduced to the ammonia burner. Startup duration encompasses the time between the initial ammonia addition to the ammonia burner and the catalytic combustor light off (fuel to catalytic combustor).

Simultaneous with the ammonia addition to the ammonia burner, introduce the ammonia upstream catalytic combustor, via line 91, if expander exit temperature is above 400° F. and catalytic combustor outlet temperature is below 1000° F. This temperature range will prevent the ammonium nitrate and the $NO_x$ formation at low and high temperatures respectively. The ammonia rate is set at 1.33 to 1.6× the maximum $NO_2$ molar flow.

Discontinue the ammonia, in line 91, to the catalytic combustor when fuel to the catalytic combustor is introduced.

The basis of the invention to control stack opacity ($NO_2$ emission) during startup and shutdown from 0 to 10% is based on three principles:

Continued air flow from the compressor increases the partial pressure of $O_2$ in the absorber and promotes $NO + \frac{1}{2}O_2 \rightarrow NO_2$.

$NO_2$ released from the absorber is minimized by maximizing absorber pressure, water flow rates to the top absorber tray and weak acid feed point, which promotes the absorption of $NO_2$ to nitric according to:

$$3NO_2 + H_2O \rightarrow 2HNO_3 + NO$$

These steps can result in less than 10% stack opacity until ammonia is injected at lower catalytic combustor temperatures. At catalytic combustor temperatures greater than 1000° F., the following reactions predominate:

$$2NH_3 + 5NO_2 \rightarrow 7NO + 3H_2O$$

$$4NH_3 + 5O_2 \rightarrow 4NO + 6H_2O$$

When the temperature in the catalytic combustor is between 400° to 1000° F., the ammonia injection over the combustor's platinum catalyst can result in 0% opacity according to reaction:

$$8NH_3 + 6NO_2 \rightarrow 7N_2 + 12H_2O$$

One should note that the ammonia injection is discontinued when the temperature in the expander outlet and the catalytic combustor is less than 400° F., to prevent ammonium nitrate formation according to reaction:

$$2NH_3 + 2NO_2 \rightarrow N_2 + H_2O + NH_4NO_3(S)$$

In order to demonstrate the efficacy of the present invention, the following example was run at an operating nitric acid plant similar to that depicted in the single figure of the drawing. But before discussing the example of the process of the present invention, it is important to briefly detail the procedure and consequences of a normal shutdown without the process of the present invention.

During a normal plant shutdown, which is initiated by a trip of the automated safety system, the absorber tower is rapidly depressurized through the catalytic combustor to the stack at a rate of about 25 psi per minute. Purge air from the air compressor enters the system at a much reduced rate when compared to the plants normal operation. Water to the absorber tower is also eliminated at the initiation of shut down. This combination of steps results in a $NO_x$ stack opacity of about 40% and sometimes greater in the four foot diameter stack of the example plant. This 40% stack opacity greatly exceeds most states' enviromental constraints.

In comparison to the normal operation, the following example of the process of the present invention is offered. Prior to testing the process of the present invention, the air compressor anti-surge control system was tested in order to assure that no air flow interruptions would result during the test run. In the test, a plant shutdown is initiated by activating the plant safety trip system, which stops the flow of ammonia to ammonia burner 25 and fuel, line 109, to catalytic combustor 57. Water addition, via line 49, to the top tray of absorber tower 39 was continued and additional water, line 43, was added to the weak acid feed point 38 of absorber tower 39. The water flow in lines 49 and 38 were as the flows would be during normal steady-state operation. The plant performance during this first stage of shutdown was: (1) catalytic combustor 57 served as a heat sink for expansion turbine 63 power and auxiliary power was provided by steam turbine 97; (2) sufficient power was available to keep the pressure of absorber tower 39 above 100 psia (a gas expansion turbine inlet valve was used when needed to maintain absorber pressure); (3) stack opacity was maintained between 5 and 10%, with an average closer to 5%; (4) catalytic combustor temperature was decreased from 1250° F. to about 1000° F.; and (5) ammonia was not injected to catalytic combustor 57 to prevent increased stack opacity.

When the temperature of the outlet gas, line 59, from catalytic combustor 57 decreased to about 1000° F., ammonia was introduced to catalytic combustor 57 via line 91. The amount of ammonia introduced was controlled to be within 1.33 to 1.6× the maximum $NO_2$ molar flow to catalytic combustor 57 as determined from prior shutdown measurements. During this stage of the process, the stack opacity was reduced to between 0% and 5% with an average very close to 0%.

The plant test was terminated when the catalytic combustor temperature reached 700° F., due to mechanical restrictions in the cool down rate of expansion turbine 63. However, it is important to note that throughout the test the stack opacity was less than 10%, which in most states is the upper environmental limit.

Although the test was terminated before the conclusion of all the steps outlined earlier in this specification, it is reasonable to believe that the remainder of the process would proceed as detailed.

If one compares the process of the present invention versus that disclosed in U.S. Pat. No. 4,330,520, significant differences will be evident. The process of U.S. Pat. No. 4,330,520 encompasses two aspects, (1) removal of $NO_x$ in heat train into containment vessel, (2) $NO_x$ removal in absorber with no gas flow, by nitric scrubbing. On the other hand, the process of the present invention encompasses three different and unique aspects, (1) removal of $NO_x$ in the heat train with air flow into the absorber, (2) $NO_x$ removal in the absorber, with air flow, by water scrubbing, (3) ammonia injection after the absorber for further $NO_x$ reduction over the catalyst.

The benefit of the present invention is that it uses existing technology in an application to which it has not been previously employed; it provides procedures to control stack opacity between 0 and 10%; and its procedures accomplished automatically through control system.

Although the present invention has been described with reference to a specific embodiment thereof, this embodiment should not be taken as a limitation on the scope of the invention. The scope of the present invention should be determined by the following claims.

We claim:

1. In a process for the production of nitric acid wherein air and ammonia are mixed and combusted in an ammonia burner to produce an effluent containing nitrogen oxides; said effluent is cooled, condensed and separated into a liquid weak acid stream and gas stream; the liquid weak acid and vapor streams are fed to an absorber tower wherein they are countercurrently contacted with water to produce a nitric acid stream and an overhead with a reduced nitrogen oxides content; and said overhead is combusted with a fuel in the presence of a catalyst in a catalytic combustor to produce a combustor exhaust, work expanded in an expander to recover energy and vented to the atmosphere as stack exhaust; the improvement for controlling the opacity of the stack opacity during shutdown of the process comprises:

(a) dicontinuing ammonia to the ammonia burner and fuel to the catalytic combustor;

(b) continuing water flow to the absorber tower and introducing additional water flow to an intermediate location of the absorber tower at rate comparable to the flow, during steady-state operation of the process, of the liquid weak acid;

(c) maximizing absorber pressure and continuing air flow to the absorber;

(d) when the outlet temperature of the catalytic combustor has decreased to about 1000° F., introducing ammonia feed to the catalytic conbustor at an effective rate, so as to control stack opacity at a level less than 10% without an ammonia breakthrough in the stack exhaust;

(e) when the exit temperature of the expander declines to a temperature at which ammonium nitrates would form, discontinuing work expansion of the combustion exhaust from the catalytic combustor and directly venting such combustor exhaust as stack exhaust; and (f) when the outlet temperature of catalytic combustor declines to a temperature at which ammonium nitrates would form, discontinuing ammonia addition via to the catalytic combustor.

* * * * *